Figure 1:
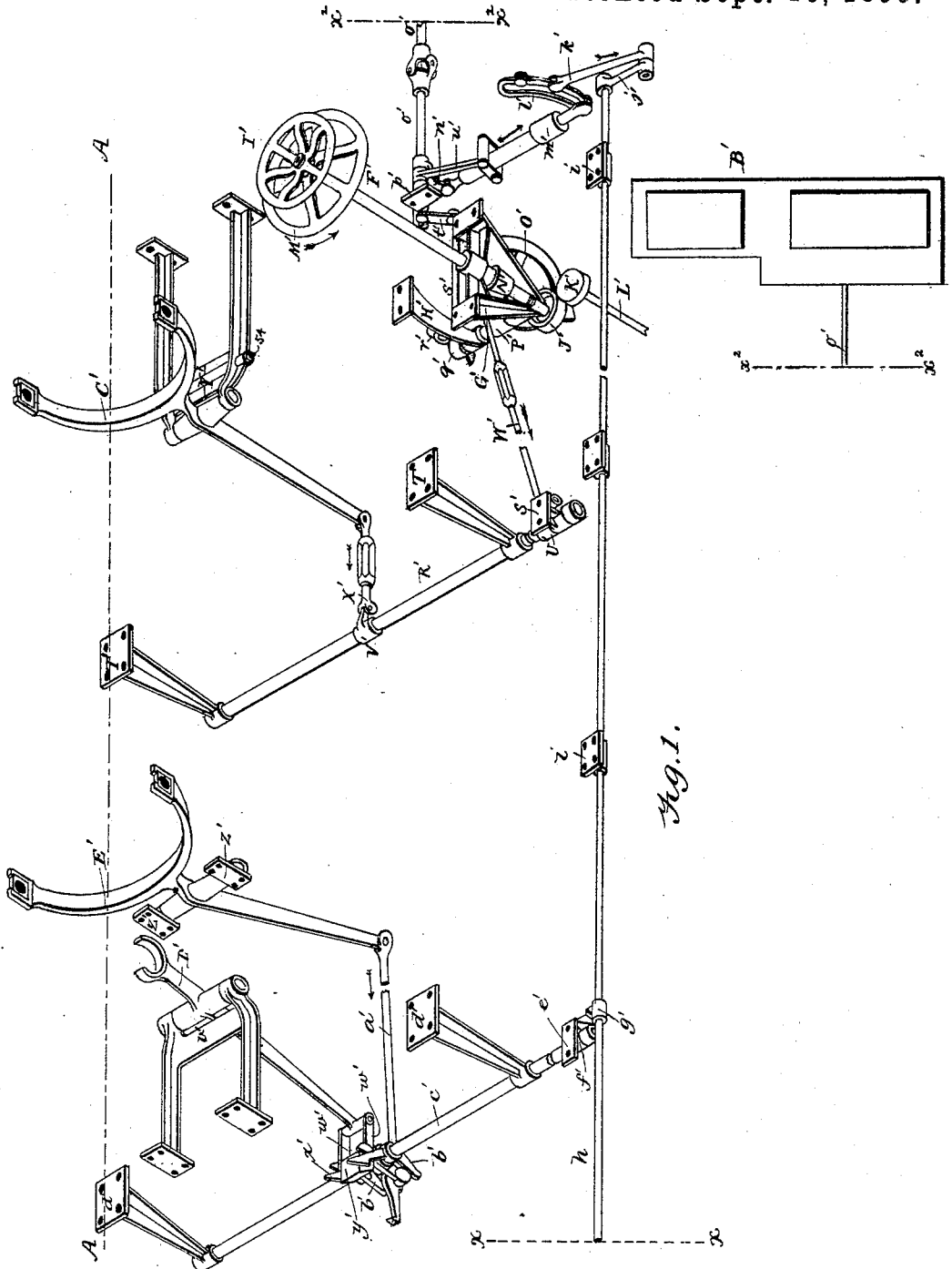
Figure 1:
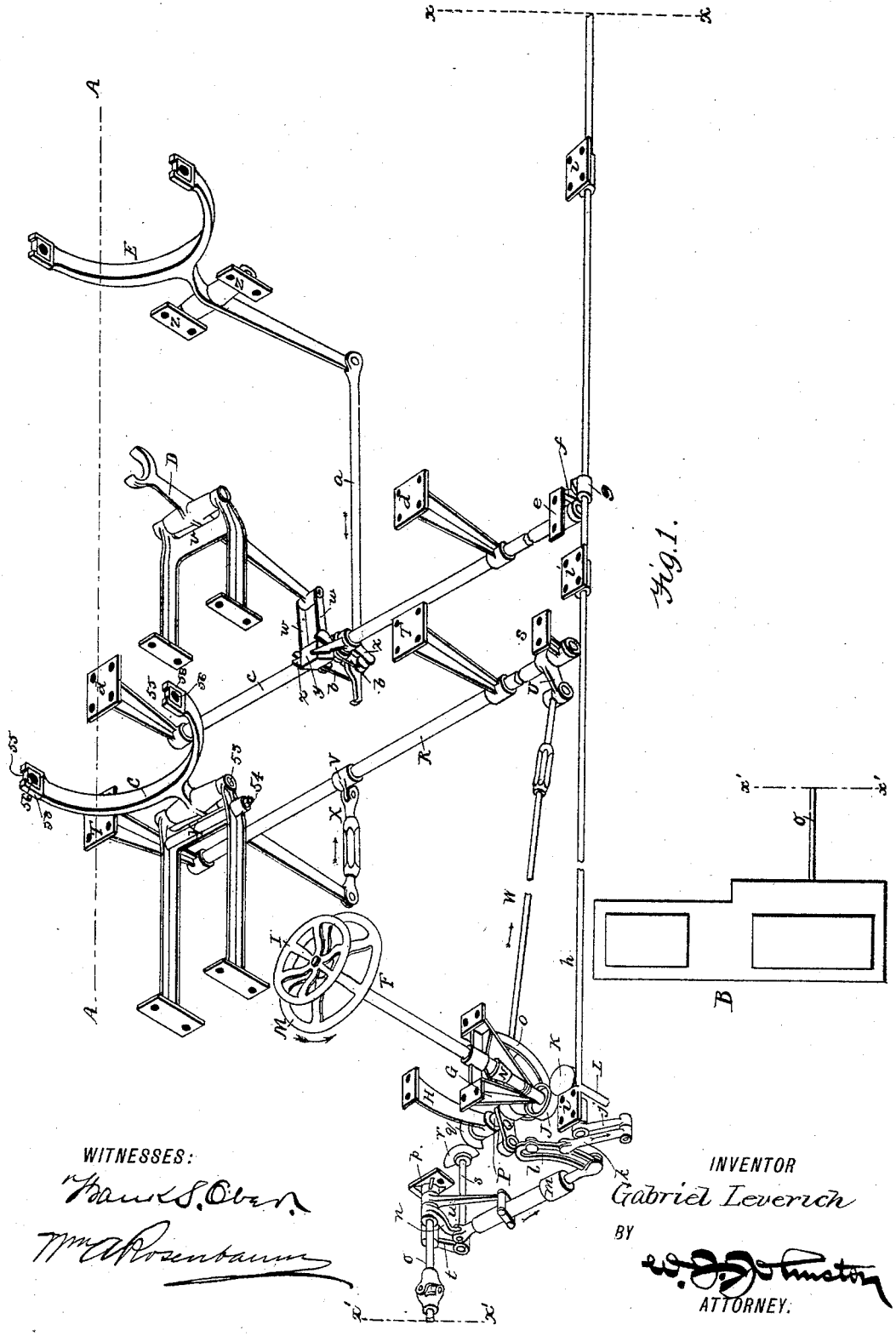

(No Model.) 14 Sheets—Sheet 1.

G. LEVERICH.
OPERATING MECHANISM FOR CABLE DRIVING MACHINERY.

No. 436,365. Patented Sept. 16, 1890.

WITNESSES:
Frank S. Ober
Wm A Rosenbaum

INVENTOR
Gabriel Leverich
BY
W. F. Johnston
ATTORNEY (No Model.)

14 Sheets—Sheet 2.

G. LEVERICH.
OPERATING MECHANISM FOR CABLE DRIVING MACHINERY.

No. 436,365. Patented Sept. 16, 1890.

WITNESSES:

INVENTOR
Gabriel Leverich
BY
ATTORNEY.

(No Model.) 14 Sheets—Sheet 3.
G. LEVERICH.
OPERATING MECHANISM FOR CABLE DRIVING MACHINERY.
No. 436,365. Patented Sept. 16, 1890.
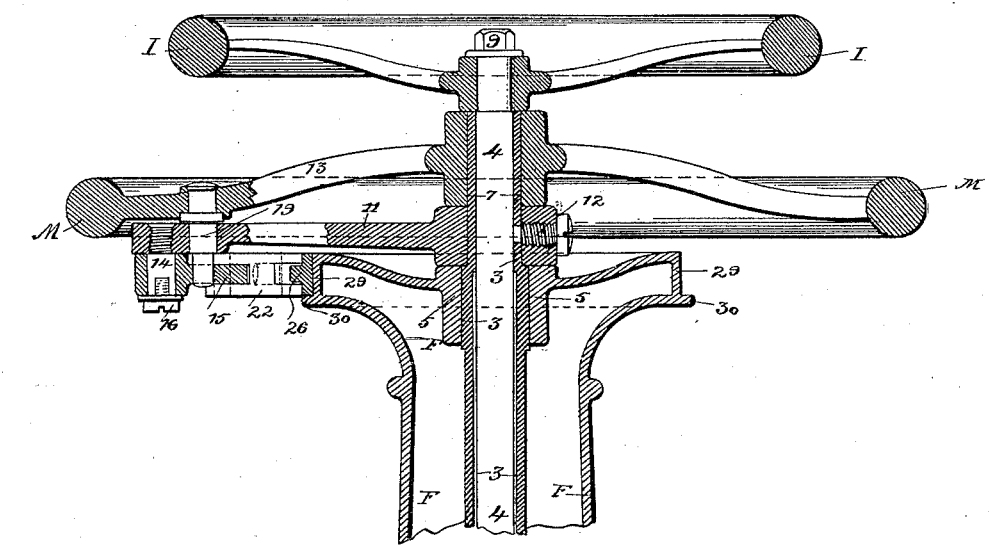
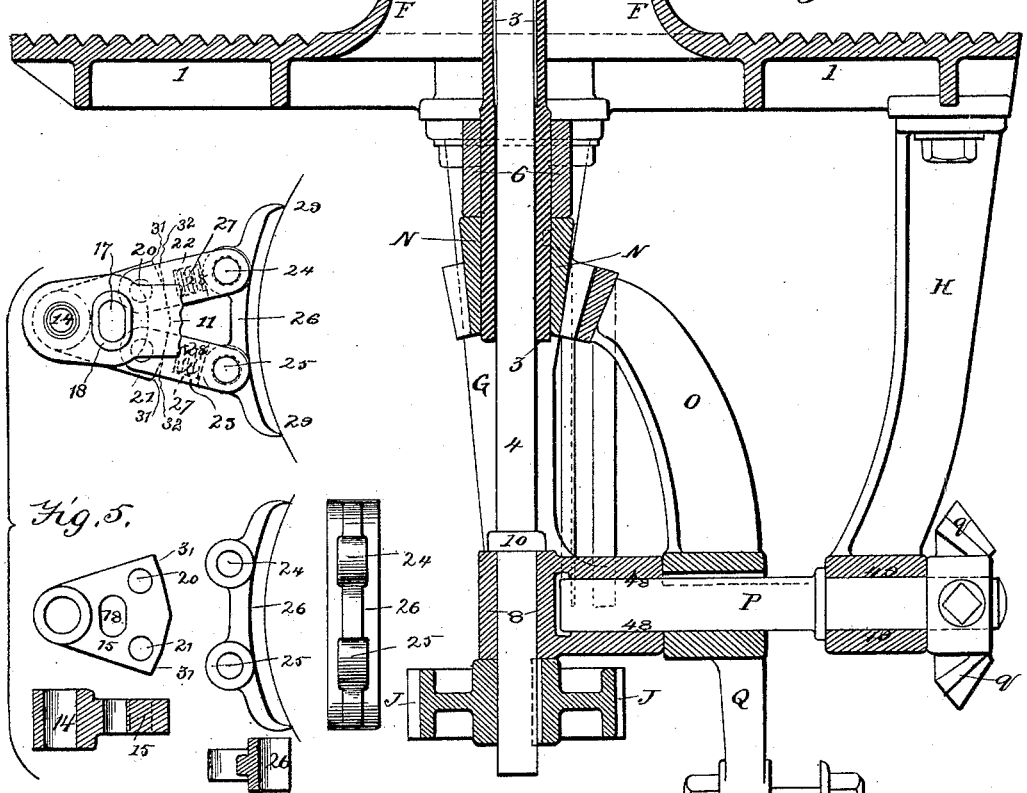
WITNESSES:
Inventor:
Gabriel Leverich (No Model.) 14 Sheets—Sheet 4.
G. LEVERICH.
OPERATING MECHANISM FOR CABLE DRIVING MACHINERY.
No. 436,365. Patented Sept. 16, 1890.
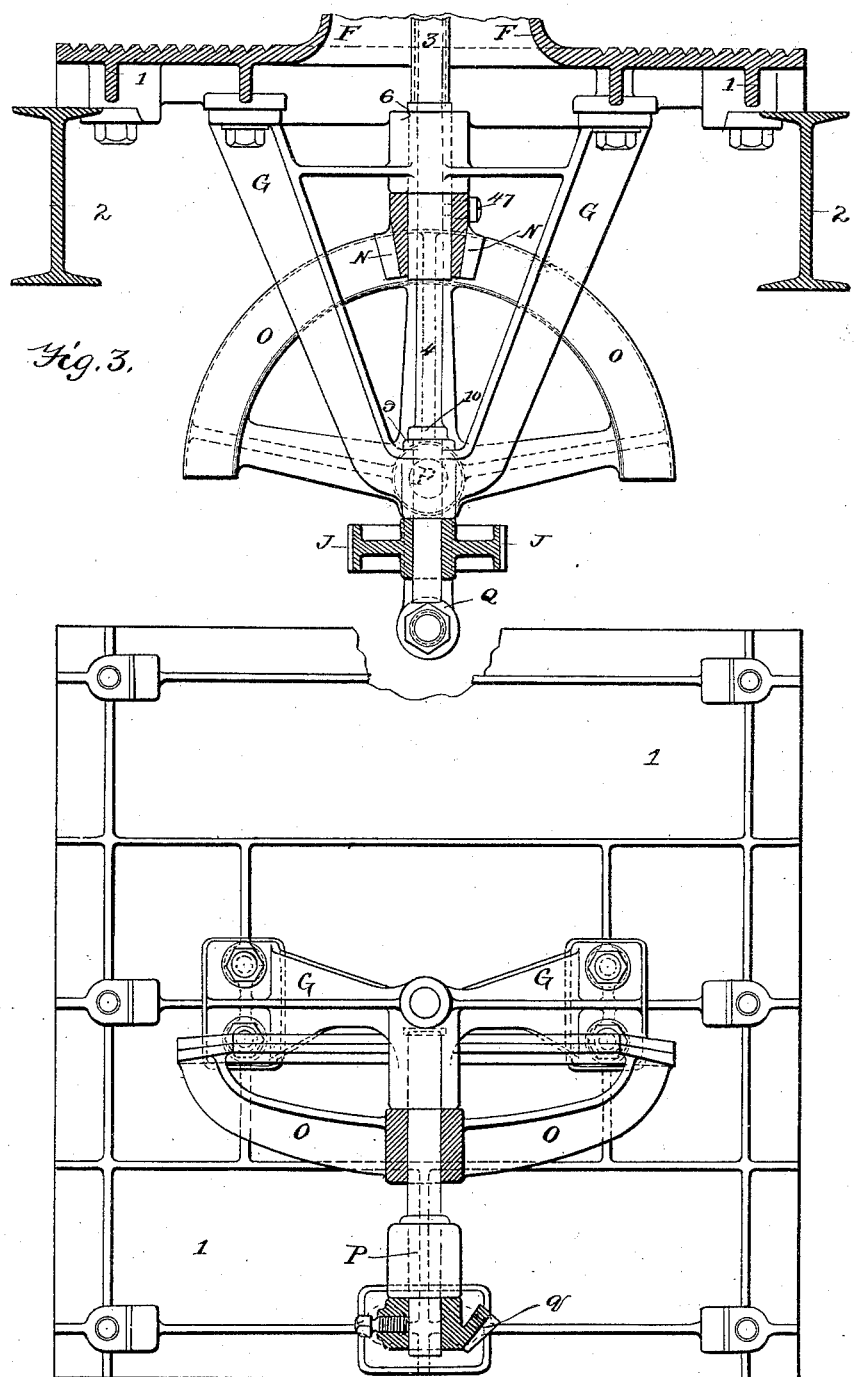
WITNESSES: Frank S. Ober, Thomas K. Trenchard.
INVENTOR Gabriel Leverich.
BY W. B. Johnston
ATTORNEY.

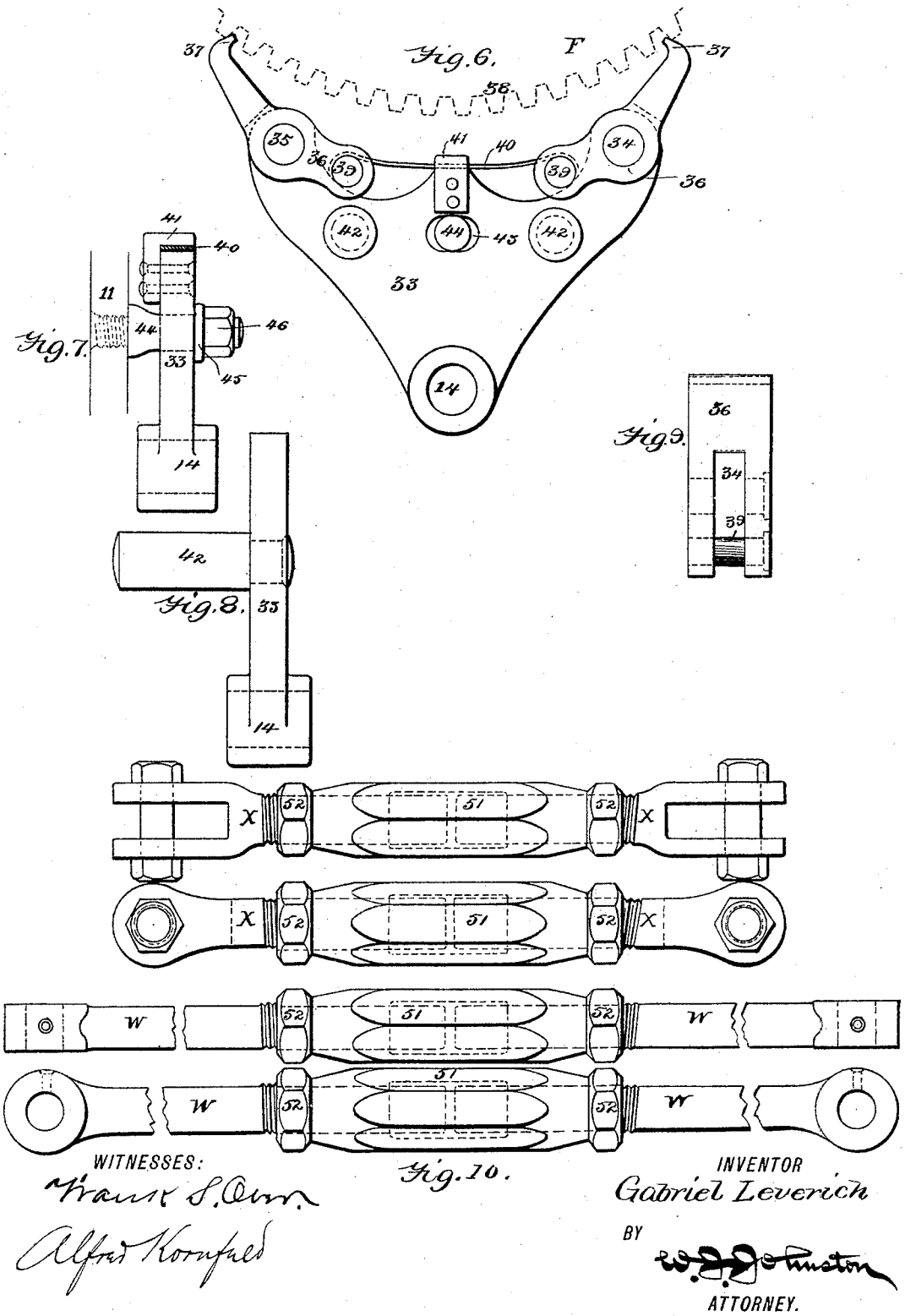

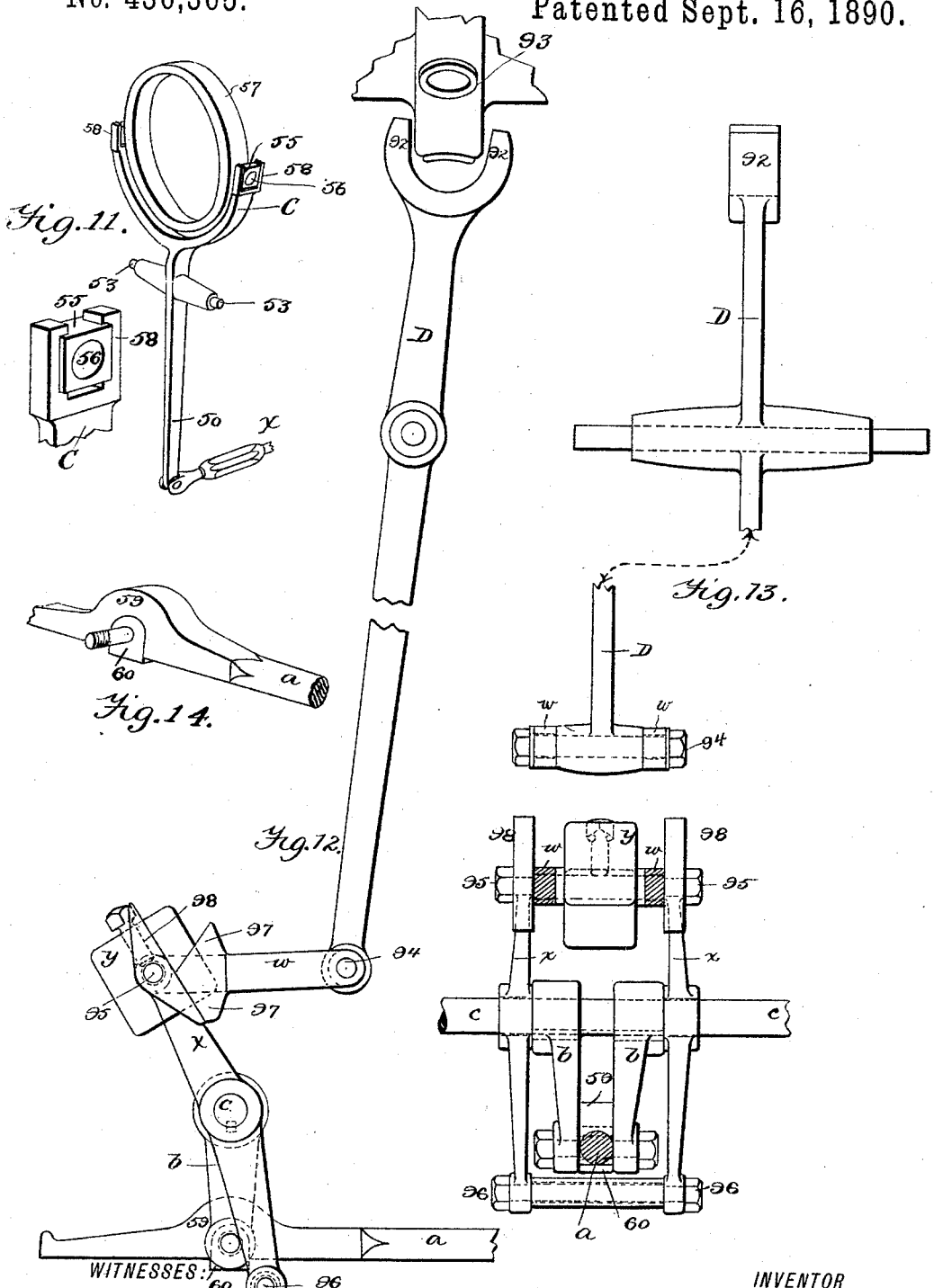
(No Model.) 14 Sheets—Sheet 6.
G. LEVERICH.
OPERATING MECHANISM FOR CABLE DRIVING MACHINERY.
No. 436,365. Patented Sept. 16, 1890.
WITNESSES:
INVENTOR
Gabriel Leverich,
BY
ATTORNEY.

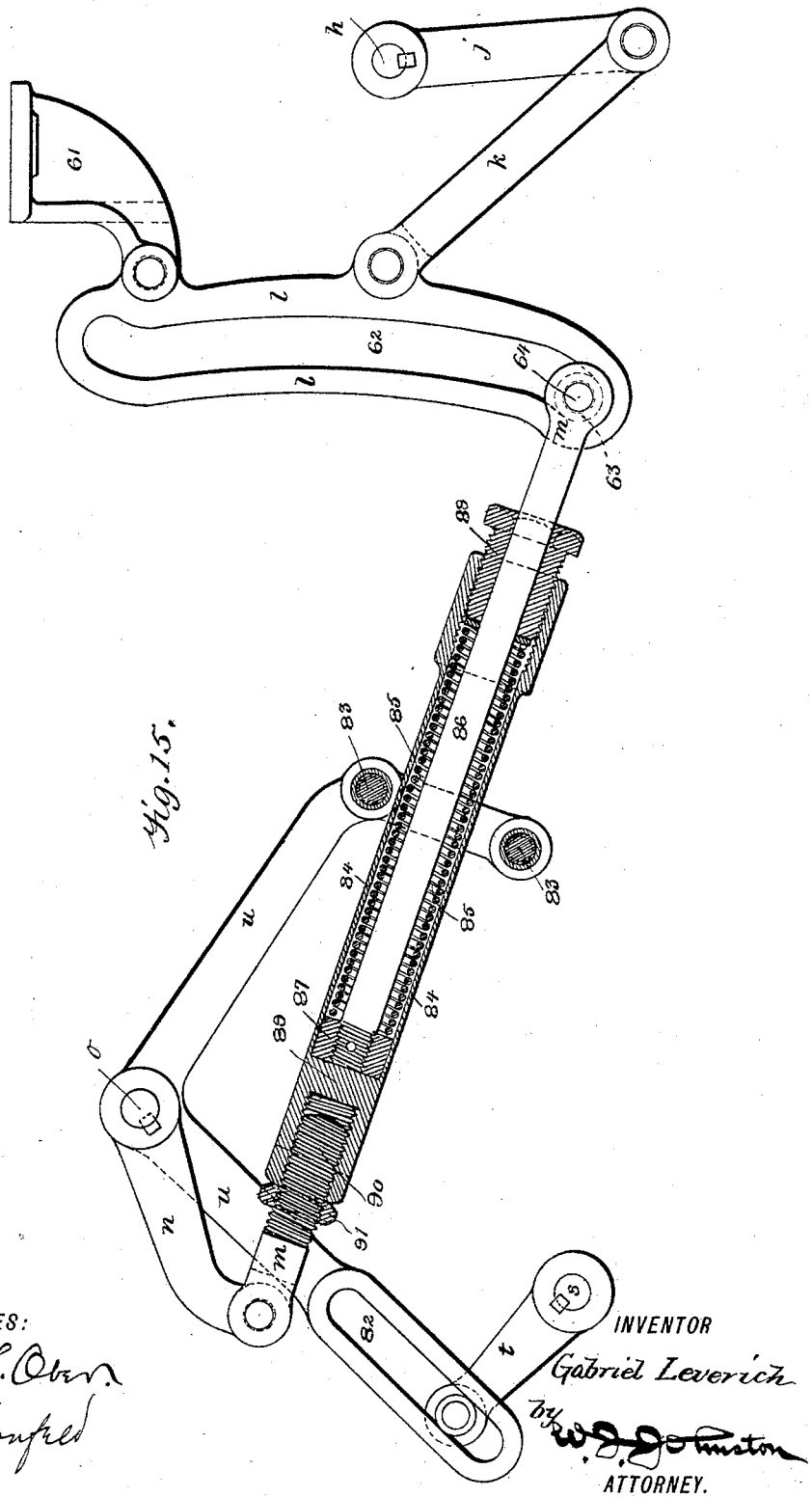

(No Model.) 14 Sheets—Sheet 8.
G. LEVERICH.
OPERATING MECHANISM FOR CABLE DRIVING MACHINERY.
No. 436,365. Patented Sept. 16, 1890.
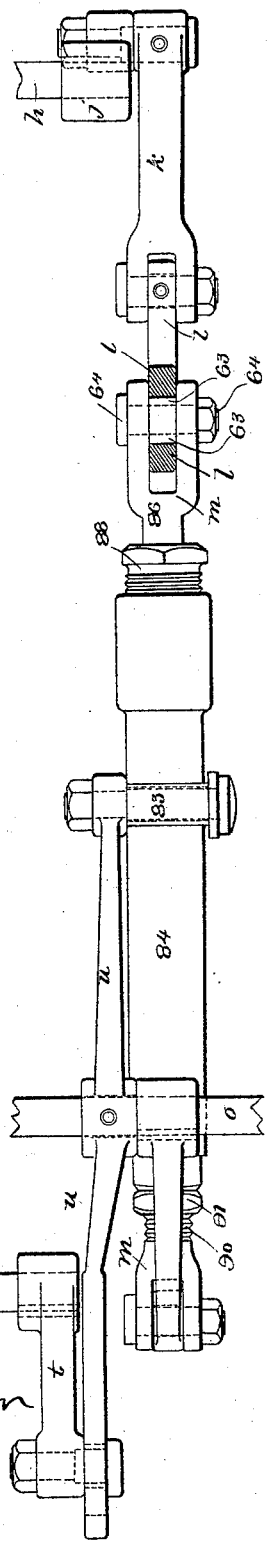
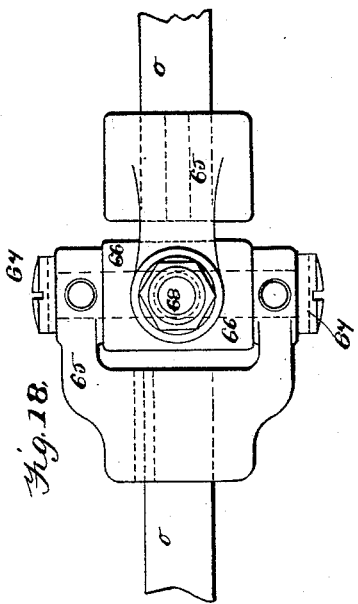
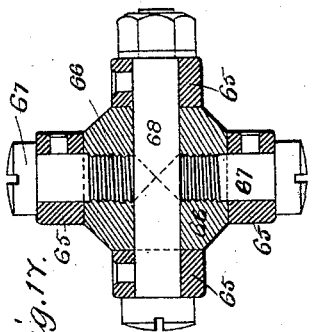
WITNESSES:
INVENTOR
Gabriel Leverich
BY
ATTORNEY.

(No Model.) 14 Sheets—Sheet 9.

G. LEVERICH.
OPERATING MECHANISM FOR CABLE DRIVING MACHINERY.

No. 436,365. Patented Sept. 16, 1890.

WITNESSES:
Frank T. Orr
Alfred Kornfeld.

INVENTOR
Gabriel Leverich,
BY
W. J. Johnston
ATTORNEY.

(No Model.)

14 Sheets—Sheet 10.

G. LEVERICH.
OPERATING MECHANISM FOR CABLE DRIVING MACHINERY.

No. 436,365.

Patented Sept. 16, 1890.

WITNESSES:

INVENTOR
Gabriel Leverich
BY
ATTORNEY.

(No Model.)

14 Sheets—Sheet 11.

G. LEVERICH.
OPERATING MECHANISM FOR CABLE DRIVING MACHINERY.

No. 436,365. Patented Sept. 16, 1890.

WITNESSES:

INVENTOR
Gabriel Leverich.
BY
ATTORNEY.

(No Model.) 14 Sheets—Sheet 12.
G. LEVERICH.
OPERATING MECHANISM FOR CABLE DRIVING MACHINERY.
No. 436,365. Patented Sept. 16, 1890.

WITNESSES:

INVENTOR
Gabriel Leverich
BY
ATTORNEY.

(No Model.) 14 Sheets—Sheet 13.

G. LEVERICH.
OPERATING MECHANISM FOR CABLE DRIVING MACHINERY.

No. 436,365. Patented Sept. 16, 1890.

WITNESSES:
Frank S. Ober
Thomas K. Trenchard

INVENTOR
Gabriel Leverich
BY
W. B. Johnston
ATTORNEY.

(No Model.) 14 Sheets—Sheet 14.

G. LEVERICH.
OPERATING MECHANISM FOR CABLE DRIVING MACHINERY.

No. 436,365. Patented Sept. 16, 1890.

WITNESSES:
Hans S. Ober.
Thomas K. Trenchard.

INVENTOR
Gabriel Leverich.
BY
ATTORNEY.

THE NORRIS PETERS CO., PHOTO-LITHO., WASHINGTON, D. C.

UNITED STATES PATENT OFFICE.

GABRIEL LEVERICH, OF SOUTH ORANGE, NEW JERSEY.

OPERATING MECHANISM FOR CABLE-DRIVING MACHINERY.

SPECIFICATION forming part of Letters Patent No. 436,365, dated September 16, 1890.

Application filed March 4, 1890. Serial No. 342,634. (No model.)

*To all whom it may concern:*

Be it known that I, GABRIEL LEVERICH, a citizen of the United States, residing in South Orange, in the county of Essex and State of New Jersey, have invented certain new and useful Improvements in Operating Mechanism for Cable-Driving Machinery, of which the following is a specification.

In power plants of cable railways driven by two or more steam-engines connected to or disconnected from a main shaft by friction-clutches it is essential that a ready and certain means of operating these clutches should be provided; also, if in such a plant two or more cables are employed and a uniform speed of the winding-drums is maintained by throttling the exhaust-steam on its passage from the driving-engine a suitable device for this purpose should be introduced, and which will be automatically thrown into or out of gear, so as always to connect only the drums and engine that at the time may be in use; and it is the object of this invention to provide such means and devices.

Figure 19:
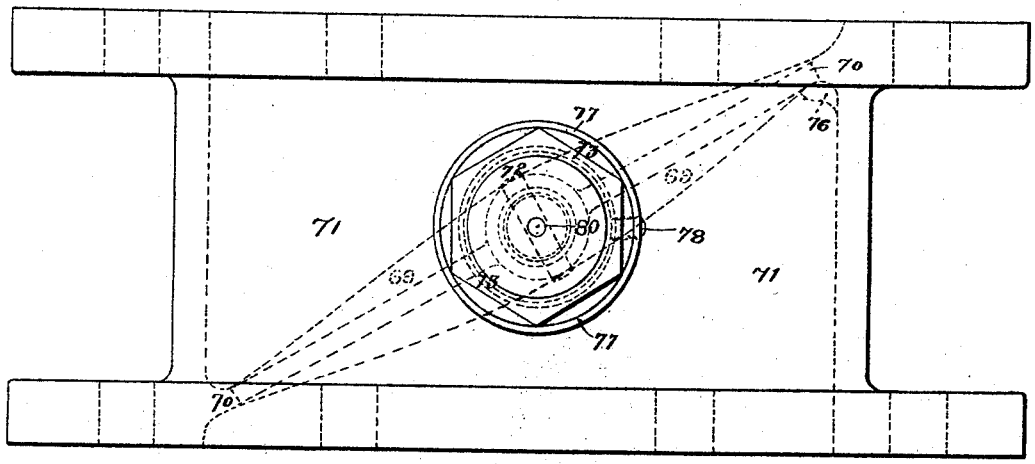
Figure 20:
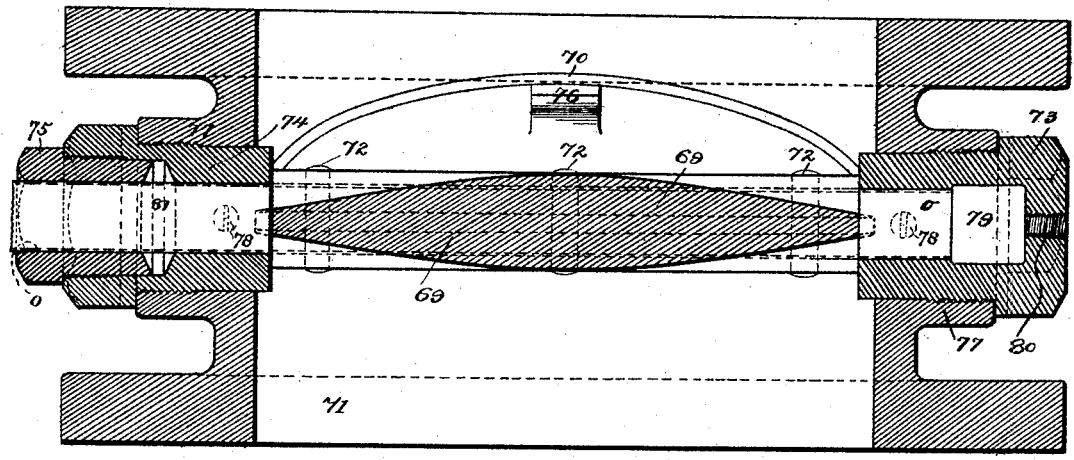
Figure 21:
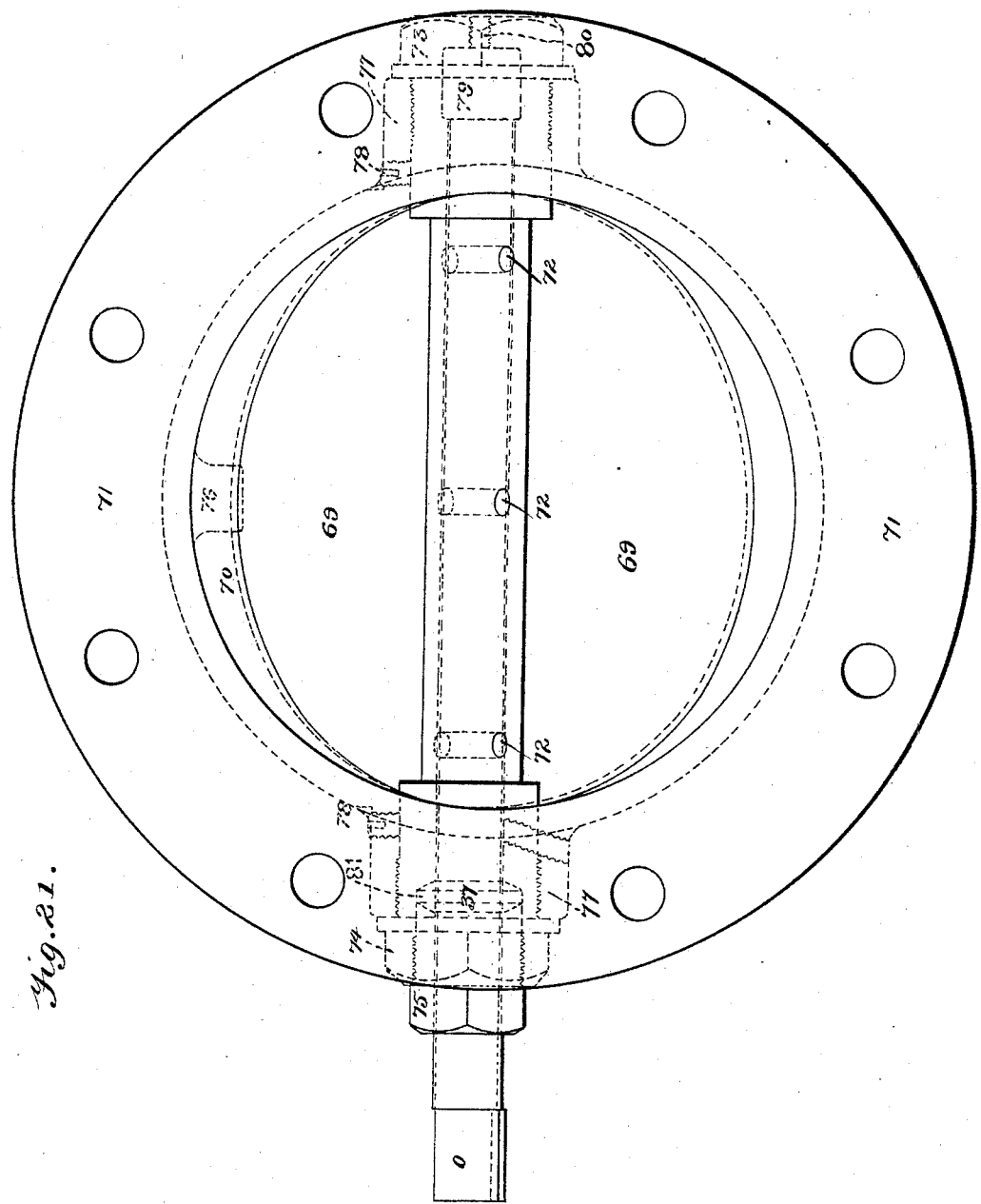
Figure 22:
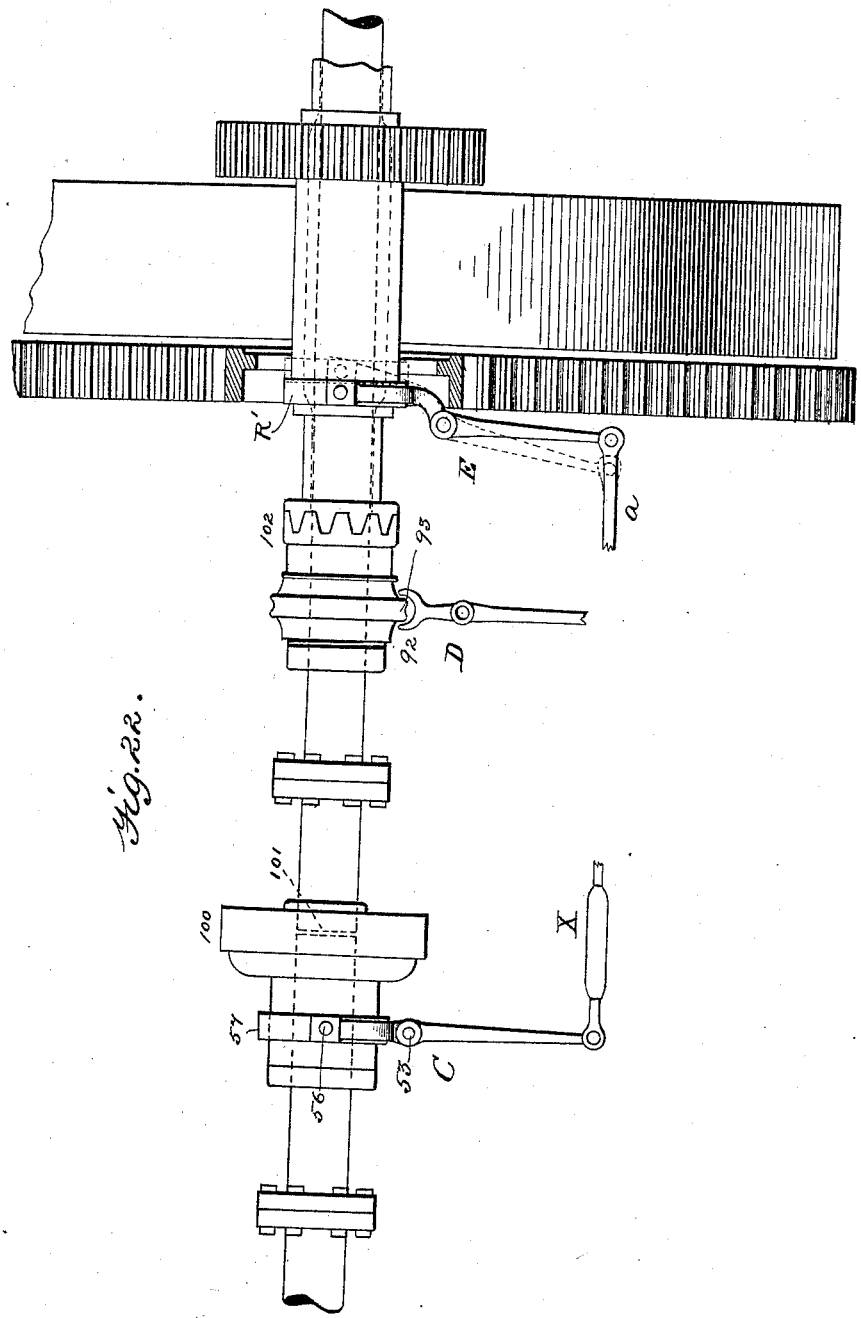
Figure 23:
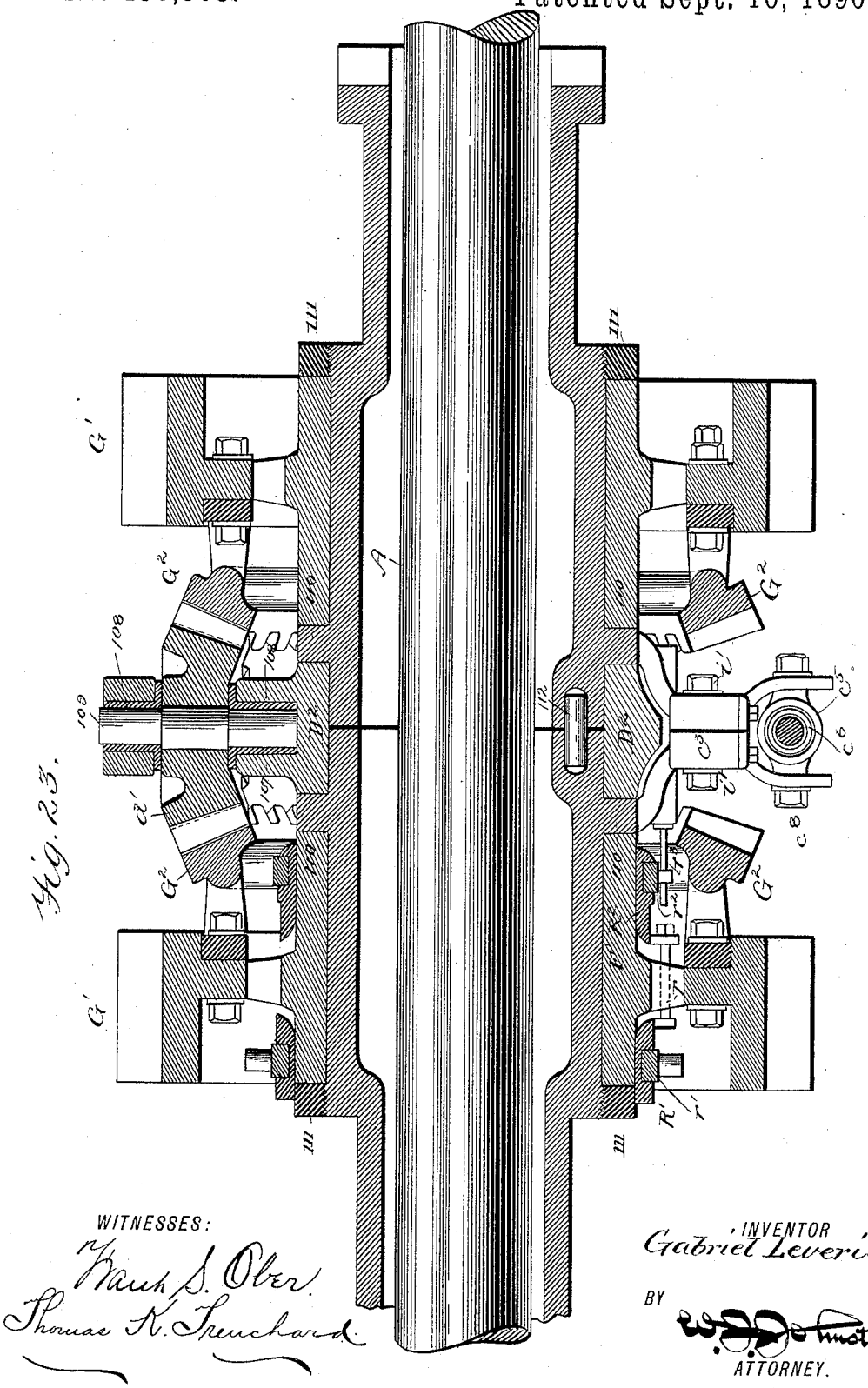
Figure 24:
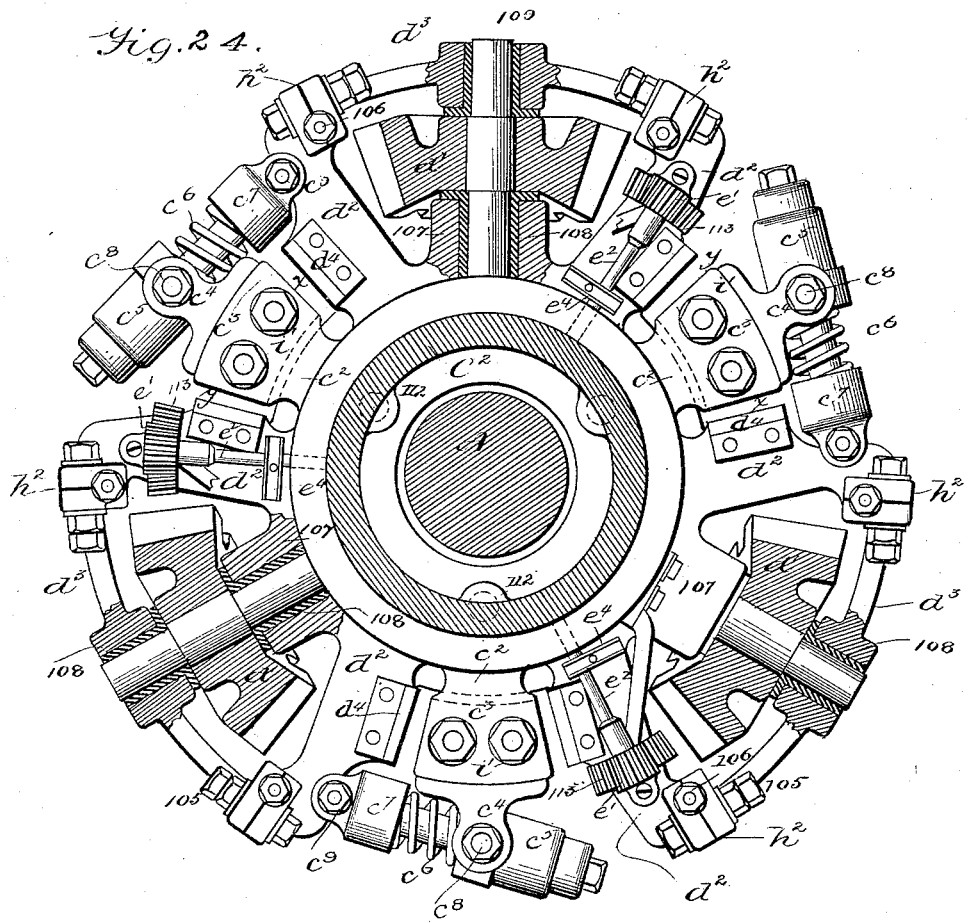
Figure 27:
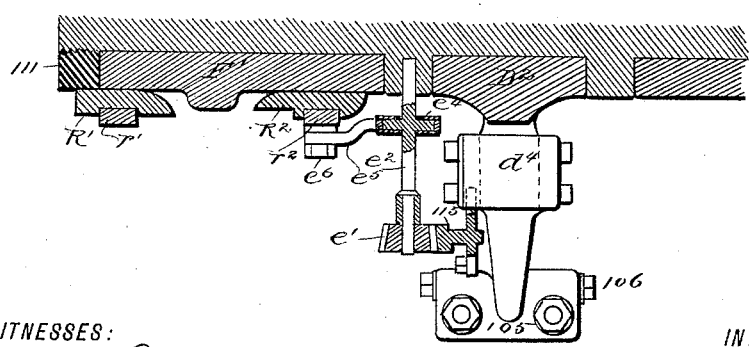
Figure 28:
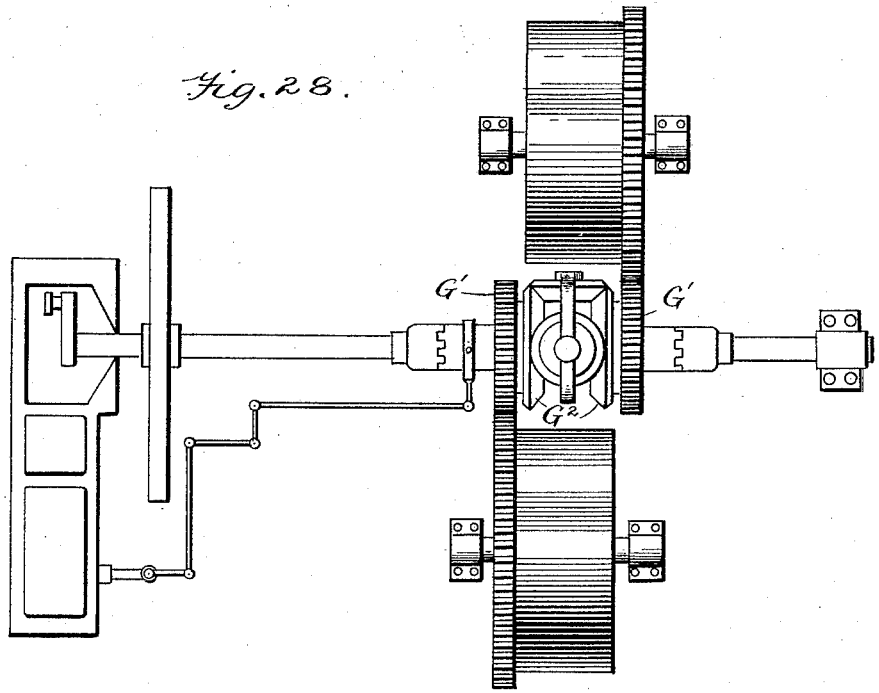
Figure 25:
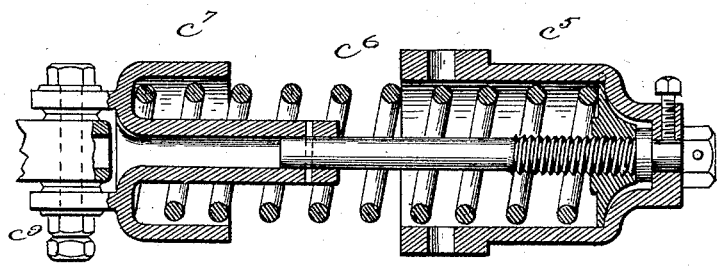
Figure 26:
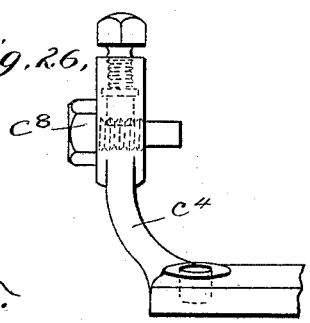

Referring to the accompanying drawings, Figure 1 represents a perspective plan of the operating-gear applied to a double-cable-driving plant. This figure occupies two sheets, the dotted lines indicating where the two parts are understood to be joined. Fig. 2 is a vertical section of the standard with parts broken out. Fig. 3 is a vertical section of the base of the standard as attached to the floor-beams, showing parts in elevation, the view being at right angles to Fig. 2. Fig. 4 is a plan, looking upward, of the lower part of the standard. Fig. 5 shows details of the toggles and clip. Fig. 6 is a plan, and Figs. 7 and 8 are side elevations, of a pawl-and-ratchet locking device. Fig. 9 is a detail of the ratchets. Fig. 10 is a detail of the connecting-rods. Fig. 11 is a perspective view of the trunnion-ring, friction-clutch lever, and connecting-rod. Figs. 12 and 13 are elevations of the hook-cranks and attached parts. Fig. 14 is a perspective of the hook-block and hook. Fig. 15 is a side elevation, with parts in section, of the link, spring-rod, and attached parts. Fig. 16 is a plan of the same. Fig. 17 is a transverse section of the universal joint. Fig. 18 is an elevation of the same. Fig. 19 is an elevation of the throttle valve-box, showing the valve in dotted lines. Fig. 20 is a vertical section of the box and valve. Fig. 21 is a view looking through the valve-box, showing the parts in plan. Fig. 22 is a side elevation showing the main shaft, one of the pair of winding-drums or clutches, and one of the gears broken out to show the sliding ring for operating the lever E. Fig. 23 is a longitudinal section of the driving-drum gear and its mechanism for imparting and regulating motion of the ring R' parallel with the shaft. Fig. 24 is a transverse section of Fig. 23. Figs. 25 and 26 are detail views of a resistance-spring and its confining parts. Fig. 27 is a detail, partly in section, of parts of the regulating device; and Fig. 28 is a sketch plan showing the pair of driving-drums and the location of the regulating devices detailed in Figs. 23 and 27.

A description of the operating-gear as applied to a power plant hauling either of two cables and driven by two steam-engines acting separately or together is as follows:

On the main shaft, of which the line A A A in Fig. 1 is the axis, are in direct and inverse order the friction-clutch of one steam-engine placed at B and operated by the lever C, a jaw clutch of one pair of winding-drums and which moves the lever D, the gear driving these drums and operating the lever E, the friction-clutch of the other steam-engine placed at B' and operated by the lever C', a jaw-clutch of the other pair of winding-drums and which moves the lever D', the gear driving these drums and operating the lever E'. The main shaft is placed above the steam-pipes, and the operating-gear generally below the floor of the power-house. The hangers and brackets supporting the latter are attached either to the main frame of the driving-plant or to the floor-beams.

The operating-gear for two driving-engines and pairs of winding-drums consists, substantially, of two like parts, a description of one part, as for the steam-engine placed at and represented by B and the adjacent pair of winding-drums, applies to the other part. Fig. 22, it will be understood, shows so much of the main shaft and its attached mechanism as would occupy the space indicated by line A A in one of the portions of Fig. 1. Located conveniently near the steam-engine placed at B (see Fig. 1) is the standard F. It projects above the floor and is bolted at its base 1 to the floor-beams 2. Passing centrally through this standard is the tubular clutch-shaft 3. (See Fig. 2.) Within this shaft and projecting at each end beyond it is the valve-shaft 4. Bolted to the under side of the base is the central hanger G and the side hanger H. The clutch-shaft revolves in the bearing 5 at the upper end of the standard and the bearing 6 in the central hanger, and the valve-shaft in the bearing 7 at the upper end of the clutch-shaft and the bearing 8, also in the central hanger, each shaft revolving independently of the other. The upper projecting end of the valve-shaft is shouldered and carries the steam-valve hand-wheel I, fastened by a key and the nut 9. Close against the bearing 8 of the valve-shaft on one side is the collar 10, and on the other side, keyed to the lower projecting end of this shaft, is the small gear-wheel J. This wheel engages with a similar gear-wheel K on the spindle L of the inlet-valve of the steam-engine placed at B. It will be seen that by rotating the hand-wheel I in one direction or the other the valve may be opened or closed and steam admitted to or shut off from the driving-engine and without rotating the clutch-shaft.

The clutch-shaft projects beyond its bearings 5 and 6. The upper end is double shouldered and carries close against the standard the crank 11, fastened to the shaft by the stud-screws 12. Between the crank and the steam-valve hand-wheel I and loose upon the clutch-shaft is the larger clutch hand-wheel M, with one arm or spoke 13 over the crank. On the stud 14, screwed into the outer end of the crank on its lower side, is the toggle-plate 15, kept in place by the screw 16, the longer axis of the arm 13, the crank 11, and the toggle-plate 15 being nearly in one radial plane through the clutch-shaft. From the enlarged end of the arm and firmly riveted to it extends downward through the slotted holes 17 in the crank and hole 18 in the toggle-plate the double-shouldered operating-stud 19.

Jointed to the toggle-plate at its inner corners on the pins 20 and 21 are the jawed single toggles 22 23, and these take hold at their inner ends on the pins 24 25 of the segmental friction piece or clip 26, the holes therefor through the latter being somewhat larger than the pins. Between each single toggle seated in the chamber 27 and pressing against the clip is the spiral spring 28. The upper end of the standard is a short vertical cylinder 29, terminating below in an annular lip 30. The clip has its inner surface fitted to this cylinder and rests on the lip.

The toggle-plate and toggles together form a pair of struts; each at its outer end swinging on the stud 14 and at its inner end on the pin 24 or 25 when the stud 14 and the pins 20 and 24 or 21 and 25 are in a straight line, in which position the flat surfaces 31 or 32 are in contact; and a pair of independent toggles, when deflected outward on the pins 20 and 21.

By the mechanism connected to the clutch-shaft the friction-clutch on the main shaft will be closed or opened by revolving the clutch hand-wheel to the right or left and is held in such position by the locking device just described until the hand-wheel is revolved in the reverse direction.

In Fig. 1 the operating parts are shown in the position taken when the clutch is closed. In opening it they are moved in the direction indicated by the arrows. When this wheel is revolved, as to the right, at first the stud 19 is brought up against the forward end of the slotted hole 18, and thereby the toggle-plate is rotated on the stud 14, also to the right, the front pair of toggles is released, the rear pair becomes a strut, and then the locking device, the crank, and the clutch-shaft are revolved by the hand-wheel until the clutch is closed. The resistance of the clutch tending to open it will then rotate the crank slightly to the left and (the friction of the clip against the standard preventing a corresponding movement) in advance of the locking device, whence the latter, under the increasing resultant pressure through the toggles, which at the time act as a strut, is made fast. Thus, it will be seen, the clutch is closed or opened whatever, from wear or other cause, may be the variation in extent of the required movement and secured in either position against any reaction solely by revolving the hand-wheel. The parts constituting the locking device, as described, must be proportioned so as to insure sufficient working friction between the clip and standard, and when required the surfaces of the latter in contact may also be roughened or covered with leather.

In certain cases, when the machinery to be driven by the friction-clutch is heavy, the locking device shown in Figs. 6, 7, 8, and 9 may be used. On the crank-stud 14 rotates the ratchet-plate 33, which, on the pivots 34 and 35, at its outer corners carries the two similar-jawed ratchets 36, each with its point 37 outward and in position to engage with the vertical trapezoidal-shaped teeth 38, cut around the standard at its upper end, in place of the cylinder 29 and its lip 30, previously described. At the inner end of each ratchet is the stop-pin 39, against which and between the jaws bears an outer end of the flat spring 40. This spring at its ends is held in place by the jaws and at its center by the keeper 41, riveted to the ratchet-plate. As seen, the rotation of the ratchets outward on their pivots is opposed by the spring and inward is limited by the stop-pins bringing up against the ratchet-plate. At equal distances on each side of the radial center line of this plate, firmly riveted to it and extending upward to loosely embrace between them the arm 13 of the clutch hand-wheel, are the two operating-studs 42. Acting as a support and guide screwed into the crank and extending downward through the slotted hole 43 in the ratchet-plate is the shouldered stud 44, with its washer 45 and nut 46 underneath the plate. This locking device is operated, also, solely by the clutch hand-wheel, and its action is similar to that of the device first described. When engaged with the tooth on the standard, the rear ratchet brings its stop-pin into contact with the ratchet-plate, and thus forms with the latter a strut from the crank-stud to the bearing-tooth.

On the lower projecting end of the clutch-shaft, fastened closely against the bearing 6 by the stud-screws 47, is the small bevel-pinion N, engaged with the sector bevel-wheel O on the shaft P, which rotates in the bearing 48 at the side of the hanger G and the bearing 49 at the lower end of the hanger H. On this shaft is the crank Q, a part of the bevel-wheel or separate from it. On another shaft R, which rotates in bearings of the hangers S, bolted to the floor-beams, and in bearings of the hangers T, bolted to the main frame of the driving plant, opposite to the crank Q is the crank U, and opposite to the friction-clutch lever C is the crank V. These two shafts are parallel and normal to a vertical plane through the axis A A A of the main shaft.

By an eye and wrist-pin at each end the rod W connects the cranks Q and U, and by a jaw and pin at each end the rod X connects the crank V with the longer arm 50 of the clutch-lever. Under the working stress the rod W is in tension, and the rod X, which is quite short, is in compression. Each is adjustable as to length by the right-and-left-threaded sleeve-nut 51, secured by the two lock-nuts 52.

The clutch-lever vibrates on its pivots 53 in two bearings at the outer end of the horizontal hanger Y, which is in two similar parts fastened together by the rod 54 and its nut and is bolted to the main frame. Above its pivots the clutch-lever is forked to embrace the projecting sleeve of the friction-clutch, and receives on each side of the main shaft in a trunnion-block 55 a trunnion 56 of the sliding ring 57, this ring being that part of the friction-clutch 100 which, when the latter is closed or opened, is moved by the lever along the main shaft to the right or left, the dotted line 101 in Fig. 22 indicating the point where the main shaft is divided. The details of this clutch are also shown in another application, serially numbered 337,355, filed January 18, 1890. To permit the trunnions to thus move horizontally without strain, and also the main shaft to be lined up or removed without changing the position of the clutch-lever, as well as to provide a large flat bearing for the connections between the lever and the friction-clutch, each trunnion-block is made of brass or other suitable metal for bearings in one square piece grooved on two sides and placed between the square jaws 58 at the outer end of a forked arm of the clutch-lever, so as to have a free movement in and out as the latter is operated.

The pressure required at the friction-clutch to close it increases rapidly as the closure is made and is much greater than the force an attendant can apply at the clutch hand-wheel. The necessary consequent multiplication of working power is in part effected by making the bevel-pinion N suitably smaller than the bevel-wheel O, and the remainder by placing relatively the cranks Q, U, and V, so that as they are rotated in closing the clutch the ratios of their effective lever-arms shall increase. The rod X and crank V form a toggle-connection between the lever C and shaft R, and the rod W and crank Q form a toggle-connection between the clutch-shaft and the crank U of the shaft R.

In operation the shafts P and R may be rotated ninety degrees, whence the cranks preferably should be so placed on their shafts that when the friction-clutch is open the crank Q will be seventy degrees, the crank U will be twenty degrees, and the crank V will be eighty-five degrees on the right side of the axis from the horizontal plane. Then when the friction-clutch is closed the crank Q will be twenty degrees, the crank U will be seventy degrees, and the crank V will be five degrees on the left side of the axis from the horizontal plane; also, the crank V and its short connecting-rod X will be brought nearly to a straight line. Hence the reaction from the friction-clutch when closed will be mostly taken transversely by the shaft R, and there will be but a slight tendency to rotation in a reverse direction. It will be seen that by this arrangement of the mechanism for operating the friction-clutch, as described, the steam-valve and the clutch hand-wheels are placed together in a convenient position in reference to the driving-engine for quick and easy manipulation by the attendant in charge.

The mechanism for automatically closing the exhaust throttle-valves is described as follows: Attached to the gear driving each pair of cable-winding drums, as shown in application, Serial No. 337,359, before mentioned, is a trunnion-ring R', which surrounds the main shaft and is moved along it by this gear to the right when the throttle-valve is to be closed, as indicated by dotted lines in Fig. 22, and to the left when the throttle-valve is to be opened, all as more fully hereinafter described. Taking hold of this ring by trunnion-blocks similar to those for the friction-clutch is the forked lever E, which vibrates on its bearings in the hangers Z, bolted to the side of the winding-drum frame. The rod $a$ at one end by a jaw and pin is attached to the lower end of this lever, and by the elongated hook 59 at the other end takes hold of the hook-block 60, loosely placed on the wrist-pin of and between the two similar facing cranks $b$ on the shaft $c$. This shaft is parallel to the shafts P and R. It rotates in its bearings at the lower ends of the hangers $d$, bolted to the main frame, and the hangers $e$, bolted to the floor-beams. The sector miter-pinion $f$ on the outer end of this shaft engages with a like miter-pinion $g$ on the shaft $h$, which is parallel to the main-shaft, and is similarly connected by the pinions $f'$ and $g'$ to the mechanism from the second pair of winding-drums. It rotates in the bearings of the hangers $i$, bolted to the floor-beams, and by its cranks $j\ j'$ and the intervening parts operates the throttle-valves of the engine placed at B and of that placed at B'.

With an eye at one end and a jaw at the other the short rod $k$ connects the crank $j$ with the link $l$, the rod taking hold near the center of the link, which at its upper end is suspended on a pin from a jawed bracket 61, bolted to a floor-beam. The curved slot 62 of the link is traversed by the roller 63 on the pin 64 in the jaws of the spring-rod $m$, which connects the link with the crank $n$ on the spindle $o$ of the exhaust throttle-valve. This spindle extends outward from the valve-case, and at its outer end has a bearing in the journal-block $p$, bolted to a floor-beam. To prevent any side strain thereon from a change in alignment, it is made in two parts, which are united by a universal joint consisting of the two like interlocking jawed couplings 65, the inclosed coupling-block 66, the two shouldered stud-screws 67, which, passing through the jaws of one coupling into the block, form one joint, and the bolt 68, which, passing through the jaws of the other coupling and the block, forms the other joint in the same plane as the first joint, normal to it and to the common axis of the spindle. To lock these stud-screws, they are made long enough to meet in the center of the block when screwed into place, and then the hole for the bolt 68 thus closed is bored out. Then the bolt inserted between the semi-cylindrical ends of the screws fastens them securely.

The exhaust throttle-valve is placed in the exhaust-pipe, which leads vertically downward from the steam-cylinder of the driving-engine and close to the latter, its net opening being somewhat greater than the sectional area of the pipe. It is described as follows: The lens-shaped circular valve-disk 69 is loosely fitted to the circular steamway or valve-seat 70 in the cylindrical valve-case 71, flanged for bolting to the steam-cylinder at one end and to the exhaust-pipe at the other. In a boss extending across the valve-disk on a chord a small distance from the diameter and fastened by the pins 72 is the valve-spindle $o$. This spindle extends on one side of the disk into the closed bush 73 and on the other side through the open bush 74 and the gland 75 outward to receive one of the jawed couplings 65 of the universal joint. In these bushes, which are of brass or other suitable metal for bearings, the disk and spindle are rotated, and to limit the range of movement to sixty degrees the valve-seat is inclined at that angle to the axle of the cylindrical case. When closed, the disk brings up along its upper edge against the stop 76. The two bushes, as shown, are shouldered and screwed steam-tight each into and adjacent its boss 77 and secured by a set-screw 78. These bosses extend outward from and are a part of the valve-case.

To insure a close and easy fit of the disk to its seat, the ends of the valve-boss are, with a circular cutting-tool, squared somewhat within the curved outline of the disk, and against the flat surfaces thus formed the inner projecting ends of the bushes bear, filling, as shown, the shallow cylindrical cavities along the opposite edges of the valve. At the end of the bearing in the closed bush is a chamber 79 for oil supplied from a cup connecting with the hole 80. The bearing in the open bush is lubricated in a like manner. The gland 75 is shouldered. When screwed into place it incloses between its inner end and the bearing the chamber 81, which contains the packing required to make the joint around the valve-spindle steam-tight. To prevent corrosion, the latter is covered its whole length with sheet-brass or other metal suitable therefor. When the pins 72 are driven out, the spindle may be withdrawn and the valve-disk removed from its case for inspection or repair.

The valve-disk when the valve is open will be vertical, and ordinarily it will be in this position, in which case the operating mechanism will be as shown, Fig. 1. To close the valve by the drum-lever E, the rods $a$, $k$, and $m$ are moved in the direction indicated by the arrows. The valve is to be opened and kept so whenever the driving-engine is disconnected from the main shaft. The sector miter-wheel $q$ on the shaft P engages with a similar miter-wheel $r$ on the shaft $s$. A roller and wrist-pin of the crank $t$ on this shaft traverse the straight slot 82 in one arm of the bell-crank lever $u$, which rocks on the valve-spindle $o$. At the end of the other arm of this lever a rectangular frame, with rollers on the pins 83 at its top and bottom, incloses the spring-rod $m$. By means of these parts it will be seen that as the clutch hand-wheel in opening the clutch is revolved to the left the spring-rod is swung on the wrist-pin of the valve-crank $n$ and its free end lifted from the lower to the upper end of the curved slot in the link $l$ and held there, whereby, if at the time the valve is partly or wholly closed, its crank is moved to its extreme position on the right and the valve is opened and kept so until the clutch hand-wheel is revolved to the left.

The resisting pressure in the steam-cylinder on the exhaust side of the piston caused by closing the exhaust throttle-valve must not exceed a certain safe limit. When this is reached, the valve must automatically open far enough to prevent a further increase of pressure. Such operation is accomplished by placing the spindle $o$ somewhat to the upper side of the valve-disk, as described, and opposing the frictional resulting pressure tending to open the valve by a spring in the rod $m$, adjusted to yield when the pressure is exceeded. Inclosed within the spring-case 84 is the coiled spring 85. This spring surrounds the rod 86 and is confined between the nut 87 on and pinned to the rod and a washer resting against the shouldered bush 88, screwed into the end of the spring-case. It is inserted under compression, the amount of which is adjusted by revolving the bush within the spring-case. Under the action of the spring the nut 87 is kept against the solid abutment 89. As the spring yields, the rod 86 is withdrawn and the valve opens. The rod 90 is screwed into the end opposite the bush of the spring-case, and by revolving the latter and then securing it by the lock-nut 91 the working length of the spring-rod is adjusted. That when the valve is closed the consequent reaction of this rod shall not be transmitted beyond the shaft $h$, the crank $j$ is fixed on this shaft, so as then to be in one plane with the connecting-rod $k$. It will be seen that by this device, applied to two or more driving-engines, the exhaust throttle-valve of each may at one time be controlled by the drum-lever E.

If two or more pairs of cable-winding drums are driven by the main shaft, provision must be made whereby when a pair is disconnected its lever E must be released from the mechanism for closing the exhaust throttle-valves. Suspended in the vertical plane of this shaft on its bearings of the hanger $v$, bolted to the main frame, is the lever D. At its upper end are the jaws 92, which loosely clasp a flange 93 of the part of a jaw-clutch 102, driving the winding-drums, which, in connecting or disconnecting the latter to or from the main shaft, is moved to the right or left along this shaft. The lower free end of the lever D, by a pair of links $w$ and pins 94 95, is attached to the double bell-crank levers $x$, which, inclosing the cranks $b$ and the rod $a$, loosely vibrate on the shaft $c$. The pin 96 at the lower ends of the levers and its roller are underneath the hook 59 and not in contact with it when the jaw-clutch is closed. When it is opened, this pin is swung to the left, and thereby the hook is lifted from its block and held. Thus the drum-lever E is disconnected from the other parts of the exhaust-throttle-valve-closing mechanism. That the hook shall have a large and close bearing when engaged with the cranks $b$, the block 60 is made as shown, the upper half with a cylindrical surface and the lower half with two plain side surfaces slightly inclined outward to insure its hanging vertically on its pin with its depth somewhat greater below than above its axis.

To prevent the jaws of the lever D from bearing against the flange 93 of the jaw-clutch after the latter is closed or opened, the space between them is made somewhat greater than the inclosed width of the flange. Then as the weight $y$ on pin 95 is thrown to one side or the other of the shaft $c$ it carries the jaws a small distance farther than the flange is moved and brings the flat surfaces of the lugs 97—a part of the links $w$ at the top or bottom—up against the like surfaces of the lugs 98—a part of the bell-crank levers $x$, as shown.

It will be seen that the mechanisms described in this specification for closing and opening friction-clutches and for operating exhaust throttle-valves of cable-driving plants may be applied, either together or separately, to other machinery to effect purposes similar to these herein set forth and without restriction as to the style of friction-clutch or exhaust throttle-valve employed.

Referring now to the gear in connection with a device for regulating the speed of a power-plant, as shown in Figs. 22 to 28, surrounding but not in contact with the main shaft A, and midway between the pair of winding-drums to be driven, is a long sleeve or hollow shaft $C^2$. Each shaft runs in its own pillow-blocks, and the two are connected or disconnected by clutches, preferably one at each end of the hollow shaft and closed toward each other. Extending radially outward from the hollow shaft at equal angular distances apart are three pairs of arms $d^2$, and on the inside of each arm at the outer end and radial to the shafts is a longitudinal flat pad $h^2$. Joining the two pads of each pair of arms, closely fitted and secured thereto by the transverse bolts 105 and the longitudinal bolt 106, is a segmental strut $d^3$, the axis of the longitudinal bolt being in the surfaces of the pad and strut end in contact. Thereby the strut will be held in place should the transverse bolts fail.

In the center of each strut is a boss. A similar boss 107 is on the outside of the hollow shaft. These two bosses are bored out and fitted with the bushes 108, of brass or other suitable material to form the bearings, in which one of three radial shafts 109, carrying a bevel-pinion $d'$, runs, the axis of each shaft being in a plane through the middle point of and normal to the hollow shaft and at an angular distance between the axis of one hundred and twenty degrees.

On the hollow shaft, one on each side of the bosses 107 and next to the shaft-bearings, are two spur-pinions G', each of which engages with a spur-wheel (see Fig. 28) fixed on the shaft of one of a pair of winding-drums, and thereby drives it. These spur-pinions revolve loosely on the hollow shaft, being kept in position against the shoulders 110 by the circular nuts 111, which screw onto the shaft near the bearings and are set up for adjustment as may be necessary from wear of the rotating parts. They are afterward held in place by set-screws. Extending inward from and bolted to each of the spur-pinions is the annular bevel-wheel G², the two wheels engaging on opposite sides with the three bevel-pinions d'.

In operation the gear so far described, if the devices shown but so far not described were omitted, will act as follows: The main and hollow shafts being clutched together and driven with these shafts, the bevel pinions and wheels and the spur-pinions will be carried around without revolving on their bearings so long as the resistances to rotation of the two drums are equal, and the latter will revolve alike and with the driving-shafts. When, however, from the extension or contraction of the several lines of cable around the drums these resistances tend to become unequal, the pinions and wheels will revolve slightly on their bearings, and the drums will revolve unlike sufficiently to compensate for the mean differences of expansion and contraction of their lines of cable, that drum which otherwise would be most laden rotating as much slower as the other does faster than the driving-shafts. In either case, however, equal power will be transmitted to the two drums.

As to the above-described gear in connection with a device for regulating the speed of the power plant, (shown in Figs. 23 to 28,) herein the main shaft A, the spur-pinions G', the bevel-wheel G², the bevel-pinions d', with their shafts 109 and bushes 108, the segmental struts $d^3$, and the circular nuts 111 are the same as above described, and the hollow shaft C² is divided on the central transverse plane into two like and symmetrical parts. Near the inner end of each part is a circular shoulder 110, and from this the three curved arms $c^2$ project radially outward at equal angular distances apart. The outer ends of these arms are enlarged and form each the half of a buffer $c^3$. The parts of the hollow shaft are united in one single straight shaft by bolts $i'$ through the buffers and dowel-pins 112. Between the shoulders 110 is an annular recess to receive loosely the ring or spider D², which, by means of the three pairs of radial arms $d^2$, their segmental struts $d^3$, their bosses 107, and bushes 108, carries the three radial shafts 109 and their bevel-pinions $d'$ in manner the same as already described. A buffer $c^3$ is between each pair of arms. On the outside of each arm and opposite to the buffer is a pad $d^4$ with a radial longitudinal exterior surface, and on each side of the buffer is a similar surface. The angular distance between the facing surfaces of the adjoining pads is somewhat greater than that between the corresponding surfaces of the intermediate buffer. Thereby the spider and its attached parts may have a small independent rotation around the hollow shaft limited by the three buffers, each coming into contact with the pad on the driving side $x'$ or the driven side $y'$. To control this independent movement, there are interposed between the buffers and the arms the three regulating-springs $c^6$, each spring inclosed at its ends in a cylindrical pocket $c^5$ or $c^7$, being attached to a buffer by a yoke $c^4$ and trunnions $c^8$, and to an arm by a bolt $c^9$, jointed at these points of attachment and by compression acting freely in the central plane transverse to the hollow shaft to oppose the approach of the two abutting surfaces on the side $x'$ toward each other.

The partial rotation, faster or slower, of the spider than of the hollow shaft is converted into a lineal reciprocating movement parallel to the shaft axis and outside of the gear, as follows: Surrounding the elongated hub F' of one of the spur-pinions G' are the rings R² R', one at each side of the arms of the pinion. These rings slide freely along the hub and are connected together as one piece by bolts $r$, which pass through holes therefor in the arms and cause the ring to rotate with the pinion. Around each ring is an external groove, into which the smaller rings $r^2 r'$, each in two parts bolted together, are fitted. The three guides $r^3$ each project longitudinally from one side of a buffer and pass loosely through a lug on the ring $r^2$, whereby the latter, though moved longitudinally with ring R², must rotate with the hollow shaft. Rotation of the ring $r'$ is prevented by the two trunnions $r^4$, placed opposite to each other, and which, engaging with the forked end of lever E, operate the exhaust throttle-valve of the driving-engine through the mechanism hereinbefore described.

The device for converting the circular motion of the spider D² around the hollow shaft C² into a reciprocating longitudinal movement of the rings R² and R' is in three parts, each like the other and placed at equal angular distances apart. That shown in Figs. 24 and 27 consists in each part of a radial shaft $e^2$, a bevel-pinion $e'$ on the outer end, and an eccentric $e^4$ near the inner end of this shaft; a segmental rack 113, which, bolted to a radial arm $d^2$ of the spider, engages with the pinion; a rod $e^5$, at one end looped around the eccentric and the other end taking hold of a stud $e^6$, projecting outward from ring $r^2$, and a brace $e^3$, that is bolted at its inner end to a shoulder 110 of the hollow shaft, at its outer end forms a second bearing in which the radial shaft $e^2$ runs. The rack-pinion and eccentric are so proportioned and located that between the limits of angular movement of the spider around the hollow shaft the eccentric makes one-half revolution, and its throw is the extent of the lineal movement of the rings.

Having thus described my invention, I claim—

1. The combination of a steam-engine, a main shaft, a pair of winding-drums driven by the engine, a clutch for connecting and disconnecting the drums to and from the shaft, mechanism connecting the drums and a valve of the engine, whereby the engine is automatically governed by the action of the drums, and connections between such mechanism and the clutch whereby the closing or opening of the clutch throws the said mechanism into or out of gear, substantially as described.

2. The combination of a steam-engine, its exhaust-valve, and its divided main shaft, a clutch for connecting and disconnecting the divided shaft, a system of levers for operating said clutch, a pair of winding-drums operating automatically the exhaust-valve of the engine, and connections between the said system of levers and the exhaust-valve, whereby when the clutch is opened the exhaust-valve is also opened.

3. The combination of an engine and a valve for throttling its exhaust-steam passage, a main shaft, a clutch for connecting and disconnecting it with the load, and a single system of levers for moving the clutch and the exhaust-valve simultaneously, whereby the clutch and valve are opened or closed simultaneously.

4. The combination of a steam-engine, its exhaust-valve, and divided main shaft with a clutch for connecting and disconnecting the divided shaft, a pair of winding-drums driven by the main shaft, mechanism through which the drums automatically operate the exhaust-valve of the engine, and a system of levers for operating the said clutch, said system of levers being geared also to the said mechanism operated by the pair of drums, whereby the latter is moved whenever the clutch-levers are moved, substantially as and for the purpose set forth.

5. In a power plant for cable-railway systems, the combination, with a plurality of engines, controlling-valves of each, and a pair of winding-drums arranged to be driven by either of the engines, of connections between the winding-drums and both valves, whereby the engines are controlled by the action of the drums.

6. In a power plant for cable-railway systems, the combination, with a plurality of engines, controlling-valves of each, and a plurality of pairs of winding-drums and clutches, whereby one or more of the pairs of drums may be driven by one or more of the engines, of mechanism connecting each pair of drums with the controlling-valve of each engine, whereby each and all engines may be controlled by each and all of the drums.

7. In a power plant for cable railways, the combination of a main shaft, a plurality of pairs of winding-drums adapted to be driven therefrom, clutch mechanism for connecting and disconnecting the drums with the main shaft, a plurality of driving-engines, any number of which are arranged to drive the main shaft simultaneously, connections between each pair of drums, a controlling-valve of each engine for automatically operating the same, and mechanism operated by the clutches when they are closed or opened to throw the valve-operating connections into or out of gear, substantially as described.

8. Mechanism for operating clutches, consisting of a pivoted yoke-lever, two parallel crank-shafts, a gear-segment on one of said crank-shafts, an operating-standard carrying a hand-wheel and a pinion, the latter engaging with the gear-segments, and link or pitman connections between the several cranks, whereby the movement of the hand-wheel effects a movement of the clutch.

9. The device for locking the hand-wheel, consisting of a frictional clip bearing upon a suitable surface, in combination with a pivoted toggle-plate, a pair of toggles pivoted to the plate and to the clip, and connections between the hand-wheel and the toggle-plate, whereby the latter is swung upon its pivot by the wheel, thereby permitting the wheel to be turned in one direction and locking it to prevent turning in the other direction.

10. The device for locking a hand-wheel, consisting of the combination of a crank to which is pivoted a toggle-plate, a pair of toggles pivoted at one end to the toggle-plate, a pin connected to the hand-wheel and extending through openings in the crank and toggle-plate, a friction-clip to which the other end of the toggles is pivoted, and a friction-surface concentric with the wheel and crank against which the cap works, substantially as described.

11. In a power plant, the combination, with an engine and its valve, a main shaft, and a clutch thereon, of a pair of operating-shafts, one inclosed within the other, each carrying a wheel for manipulation, and separate mechanism connected with each shaft, whereby the clutch and the engine-valve may be operated by an attendant from or at a single point, substantially as and for the purpose set forth.

12. In a cable-driving plant, the combination, with the exhaust-valve of the driving-engine and a pair of winding-drums, of connections between the winding-drums and the exhaust-valve, whereby said valve is operated by the action of the drums.

13. In a cable-driving plant, a valve located in the exhaust-passage of the engine, in combination with a pair of winding-drums, a crank on the valve-stem, a pivoted lever operated by the winding-drums, and a system of levers running from the crank to the lever, whereby the action of the drums operates the valve.

14. The combination, with the lever E, arranged to be moved in the manner described, and an exhaust-valve of one engine, of a system of levers connecting lever E with the valve whereby the latter is operated and a spring arranged in the system of levers adapted to yield when the pressure of exhaust-steam upon the valve rises above a predetermined point.

15. A system of levers for moving a clutch, in combination with a system of levers for moving a valve and connections between the two systems whereby the latter is thrown into or out of operative condition by the former.

16. A system of levers for operating an engine-valve and including crank $n$ on the valve-stem, rod $m$, attached at one end to the end of the crank and at the other end carrying a roller, and a pivoted link $l$, in which said roller works, in combination with a system of levers for operating a clutch on the shaft which the engine drives and including a bell-crank lever operatively connected with said rod $m$, whereby the end of the latter may be moved through the link, for the purpose set forth.

17. The combination, with an engine, its valve, and shaft, of a clutch on the shaft for connecting it with and disconnecting it from the load, a lever, as D, moved by the clutch, and an automatic valve-controlling mechanism, the lever D being arranged to throw the valve-operating mechanism into and out of gear.

18. The combination of the lever D, the lever E, and the shaft $c$, the last carrying a crank $b$, a hook attached to lever E and arranged to engage with the pin of crank $b$, a bell-crank lever pivoted upon said shaft $c$, and connections between the bell-crank lever and lever D, the bell-crank being arranged, when vibrated, to lift the hook out of engagement with the crank-pin.

19. The combination, with the valve-spindle, of a crank thereon and a spring-rod connected with the crank through which the crank is moved, said spring-rod consisting of the case 84, the spring 85, and the rod 86, the rod adapted to slide in the case, its movement being influenced by the spring, the tension-nut 88, and the lengthening-screw 90, substantially as described.

20. The combination, with a sliding trunnion-ring and a pivoted trunnion-lever, of trunnion-bearings, each consisting of a square block having a groove cut in two sides, the groove fitting into forks formed in the trunnion-lever and adapted to slide therein, the trunnion being carried by the blocks, substantially as described.

21. The mechanism for operating a friction-clutch, consisting of a lever, an operating-shaft, an intermediate shaft having a crank, a toggle-connection between the lever and intermediate shaft, and a toggle-connection between the operating-shaft and said crank, combined, as and for the purpose set forth.

22. The combination, with the friction-clutch and its lever C, of the shaft R, having cranks U and V, rod X, connecting lever C and crank V, the shaft P, having bevel-gear O and crank Q, rod W, connecting the cranks Q and U, and the operating-shaft 6, having bevel-pinion, substantially as described.

23. The combination, with the trunnion-ring and trunnions, of trunnion-blocks and a trunnion-lever, the blocks being arranged to slide in ways on the lever.

In witness whereof I have hereunto signed my name in the presence of two subscribing witnesses.

GABRIEL LEVERICH.

Witnesses:
THOMAS K. TRENCHARD,
DUDLEY R. COVERLY.